(12) United States Patent
Choi et al.

(10) Patent No.: US 8,411,033 B2
(45) Date of Patent: Apr. 2, 2013

(54) INFORMATION INPUT DEVICE AND METHOD AND MEDIUM FOR INPUTTING INFORMATION IN 3D SPACE

(75) Inventors: Eun-seok Choi, Anyang-si (KR); Jun-il Sohn, Yongin-si (KR); Won-chul Bang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 701 days.

(21) Appl. No.: 11/898,055

(22) Filed: Sep. 7, 2007

(65) Prior Publication Data

US 2008/0143676 A1 Jun. 19, 2008

(30) Foreign Application Priority Data

Dec. 18, 2006 (KR) ........................ 10-2006-0129537

(51) Int. Cl.
 *G06F 3/033* (2006.01)
 *G09G 5/08* (2006.01)
(52) U.S. Cl. .................... 345/158; 345/156; 702/152
(58) Field of Classification Search ........... 345/156–173
 See application file for complete search history.

(56) References Cited

U.S. PATENT DOCUMENTS

| 5,444,462 | A | * | 8/1995 | Wambach | 345/158 |
| 6,043,805 | A | * | 3/2000 | Hsieh | 345/158 |
| 2005/0174326 | A1 | * | 8/2005 | Soh et al. | 345/156 |
| 2006/0028446 | A1 | | 2/2006 | Liberty et al. | |

FOREIGN PATENT DOCUMENTS

| JP | 2005-266840 | 9/2005 |
| KR | 2000-0063192 | 11/2000 |
| KR | 2003-0006325 | 1/2003 |
| KR | 10-2005-0077364 | 8/2005 |

OTHER PUBLICATIONS

Chinese Office Action issued on Oct. 12, 2010 in corresponding Chinese Patent Application No. 200710300117.1.
European Search Report issued on Nov. 11, 2010 in corresponding European Patent Application No. 07123111.2.
Chinese Office Action dated Apr. 25, 2011, issued in Chinese Patent Application No. 200710300117.1.

* cited by examiner

*Primary Examiner* — Viet Pham
(74) *Attorney, Agent, or Firm* — Staas & Halsey LLP

(57) ABSTRACT

An information input device and a method and medium for inputting information in three-dimensional (3D) space are provided. The information input device includes a movement signal input unit receiving a movement signal of the information input device under control of a user in a three-dimensional (3D) space, a movement extent calculating unit calculating an extent of a movement of the information input device by analyzing the received movement signal, a movement identification unit identifying a type of the movement by comparing the calculated extent of the movement with a predetermined threshold, and a signal processor processing the received movement signal so that an instruction corresponding to the identified type of movement is performed.

5 Claims, 8 Drawing Sheets

INFORMATION INPUT DEVICE AND METHOD AND MEDIUM FOR INPUTTING INFORMATION IN 3D SPACE

CROSS-REFERENCE TO RELATED APPLICATIONS

This application claims the priority benefit of Korean Patent Application No. 10-2006-0129537 filed on Dec. 18, 2006 in the Korean Intellectual Property Office, the disclosure of which is incorporated herein by reference in its entirety.

BACKGROUND OF THE INVENTION

1. Field of the Invention

The present invention relates to an information input device used in three-dimensional (3D) space, and more particularly, to an information input device and method and medium for inputting information in a 3D space.

2. Description of the Related Art

Most existing computer mice, such as ball mice and optical mice, are moved while being in physical contact with the plane. In a case where a three-dimensional (3D) graphical user interface (GUI) is provided, however, the conventional mouse that is moved on only a plane cannot be compatibly used with the 3D GUI.

Thus, various types of spatial input devices (a mouse, etc.) that operate in a 3D space using an inertia sensor, such as an acceleration sensor or an angular velocity sensor (or a gyroscope sensor), have been introduced, and some of them have been in common use.

However, a button click operation has still been performed using a button of an input device. Therefore, the input device is moved by a force that is applied by the user when clicking the button, and the movement of the input device causes the location of a cursor before clicking the button to be different to a location after clicking the button. Accordingly, even if the user clicks the button at a desired cursor location, the precision of pointing is significantly degraded, thus causing an input error.

Korean Patent Laid-Open Publication No. 2005-077364, entitled "Method for Adjusting Pointing Position according to Click Operation in Space and Spatial Input Device therefor", discloses a method of adjusting a pointing position using a spatial input device that includes a first unit that detects the movement of a hand and a second unit that detects the movement of a finger. The method includes detecting and outputting a hand movement signal using the first unit, setting a pointing position on a display according to the hand movement signal, waiting for a click signal generated by the second unit for a second period of time when the hand movement signal is not detected during a first period of time, outputting the click signal if the click signal is generated within the second period of time, and preventing the hand movement signal, which is generated by the first unit, from being output during the second period of time. In this case, it is necessary to prepare both an angular velocity sensor that senses the movement of a hand and an acceleration sensor that senses the movement of a finger. Thus, no recitation of technique for improving the performance of pointing in a 3D space using only an angular velocity sensor (e.g., a gyroscope sensor) has yet been proposed.

SUMMARY OF THE INVENTION

According to an aspect of the present invention, the present invention provides precisely inputting information in a three-dimensional (3D) space.

According to an aspect of the present invention, there is provided an information input device for inputting information in three-dimensional (3D) space, the information input device including a movement signal input unit to receive a movement signal of the information input device in a 3D space under control of a user, a movement extent calculator to calculate an extent of a movement of the information input device by analyzing the received movement signal, a movement identifier to identify a type of the movement by comparing the calculated extent of the movement with a predetermined threshold, and a signal processor to process the received movement signal so that an instruction corresponding to the identified type of the movement is performed.

According to another aspect of the present invention, there is provided a method for inputting information in a three-dimensional (3D) space, including receiving a movement signal of an information input device in a 3D space under control of a user, calculating an extent of a movement of the information input device by analyzing the received movement signal, identifying a type of movement by comparing the calculated extent of the movement with a predetermined threshold, and processing the received movement signal so that an instruction corresponding to the identified type of movement is performed.

According to another aspect of the present invention, there is provided at least one computer readable medium storing computer readable instructions to implement methods of the present invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Exemplary embodiments of the present invention may, however, be embodied in many different forms and should not be construed as being limited to these exemplary embodiments set forth herein. Rather, these exemplary embodiments are provided so that this disclosure will be thorough and complete and will fully convey the concept of the invention to those or ordinary skill in the art.

Figure 1:
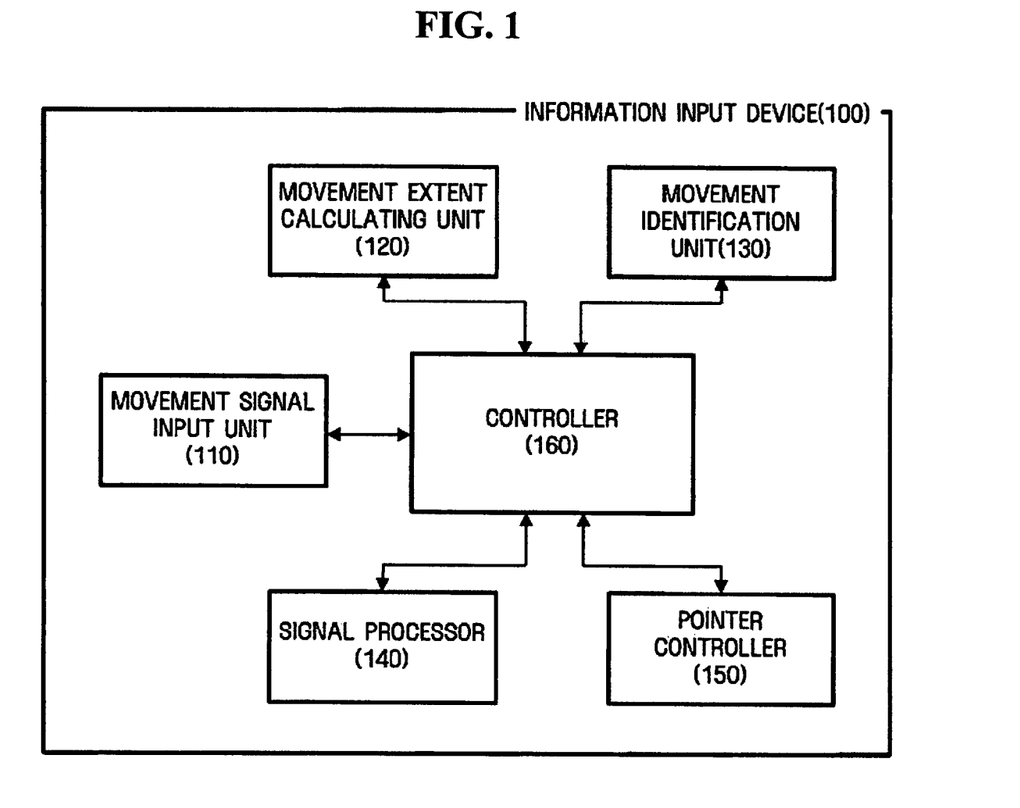
FIG. 1 is an internal block diagram of an information input device for inputting information in a three-dimensional (3D) space according to an exemplary embodiment of the present invention.

FIG. 1 is an internal block diagram of an information input device for inputting information in a three-dimensional (3D) space according to an exemplary embodiment of the present invention.

As illustrated in FIG. 1, an information input device 100 includes a movement signal input unit 110, a movement extent calculating unit 120, a movement identification unit 130, a signal processor 140, a pointer controller 150, and a controller 160. Here, the information input device 100 is a remote controller for controlling electronic devices, such as a television (TV), a digital versatile disc (DVD), and an air conditioner, or a mouse of a personal computer (PC). An object that is to be controlled by the information input device 100 may be an electronic device separated from the information input device 100, or a combination of an electronic device and the information input device 100.

The movement signal input unit 110 receives a movement signal of the information input device 100 when a user moves the information input device 100. Here, the movement of the information input device 100 may be measured using an inertia sensor, and the measured inertia signal represents the direction and speed of the movement of the information input device 100. The present invention has been described with respect to a gyroscope sensor as the inertia sensor but is not limited thereto. Also, the gyroscope sensor measures an angle through which the information input device 100 is moved per second. The measured gyro signal is used to calculate the extent of the movement of the information input device 100 using the movement extent calculating unit 120.

The movement extent calculating unit 120 calculates the extent of the movement of the information input device 100 based on the movement signal (the gyro signal) received via the movement signal input unit 110. Here, the extent of the movement is calculated based on the values of the x-axis (movement from top to bottom) and the y-axis (movement from side to side) of the gyro signal.

That is, an equation of calculating the extent of movement (S) is S=max{var(Wbx),var(Wby)}, wherein max denotes a maximum value, Wbx denotes an x-axis gyro signal, Wby denotes a y-axis gyro signal, and var denotes a variance. For example, if an input value is x, a variance of the input value x is calculated by $$\mathrm{var}(x) = \frac{1}{N-1} \sum_{i=n-N}^{n} (x_i - \bar{x})^2.$$

Here $$\bar{x} = \frac{1}{N} \sum_{i=n-N}^{n} x_i,$$

N denotes the total number of samples, a variance of which is to be calculated, and n denotes a current sample number. It is possible to obtain a variance from the current sample number n to a previous sample number N using the above method.

The movement identification unit 130 identifies the type of the movement of information input device 100 by comparing the extent of the movement calculated by the movement extent calculating unit 120 with a predetermined threshold. Here, the type of the movement includes a button click operation and a drag & drop operation (hereinafter referred to as "a drag operation") of the information input device 100.

For example, the movement identification unit 130 identifies the type of movement of the information input device 100 to be the drag operation when the calculated extent of the movement of the information input device 100 is greater than the predetermined threshold, and to be the button click operation when the calculated extent of the movement of the information input device 100 is smaller than the predetermined threshold. The threshold is determined to be greater than the extent of movement that is generally generated when a button click operation is performed and be smaller than the extent of movement that is generally generated when a drag operation is performed. Also, a user may freely set or change the threshold. For example, the threshold may be set to 10 or 15 when it is assumed that the extent of movement calculated when the user performs the button click operation using the information input device 100 is 5 or 7 and the extent of movement calculated when the user performs the drag operation using the information input device 100 is 25 or 30.

The signal processor 140 processes the received movement signal so that an instruction corresponding to the type of movement identified by the movement identification unit 130 is performed.

For example, when the identified type of movement is the button click operation of the information input device 100, a signal value of a gyroscope sensor is not output for a predetermined amount of time during the button click operation. Here, the fact that the signal value of the gyroscope sensor is not output indicates that the value of the movement signal is maintained at "0" in order to prevent the location of a pointer of the information input device 100 from being changed when a desired object is selected through the button click operation of the information input device 100. Also, the predetermined amount of time denotes a time interval between when the user clicks a button of the information input device 100 and when the user cancels the clicking of the button. If the identified type of the movement is the drag operation of the information input device 100, the gyro signal generated by the gyroscope sensor is processed. Here, the pointer of the information input device 100 is to be moved based on the magnitude of the generated gyro signal. The movement signal generated as a result of the button click operation of the information input device 100 and a method of controlling the movement signal will now be described in greater detail with reference to FIGS. 3A and 3B.

For example, if the information input device 100 is a mouse, the location of the mouse moves downward through a predetermined angle when a user clicks a button of the mouse in a 3D space. Then, the gyro signal output from the gyroscope sensor is changed accordingly, and thus, the pointer of the mouse, located on a predetermined object, moves downward by a predetermined distance. Accordingly, when the user clicks the mouse, if the gyro signal is not output irregardless of whether the location of the mouse is changed, the location of the pointer of the mouse does not change even if the mouse is moved downward, thereby maintaining the location of the pointer on the predetermined object.

The pointer controller 150 changes or maintains the location of the pointer based on the signal processed by the signal processor 140.

For example, the pointer controller 150 moves the pointer by a predetermined moving distance and in an upward, downward, left, or right direction, or maintains the location of the pointer on the predetermined object, based on the value of the gyro signal measured by the gyroscope sensor. Here, the pointer is moved at a speed corresponding to the magnitude of the gyro signal.

The controller 160 controls the operations of the functional blocks 110 through 150 of the information input device 100.

Figure 2A:
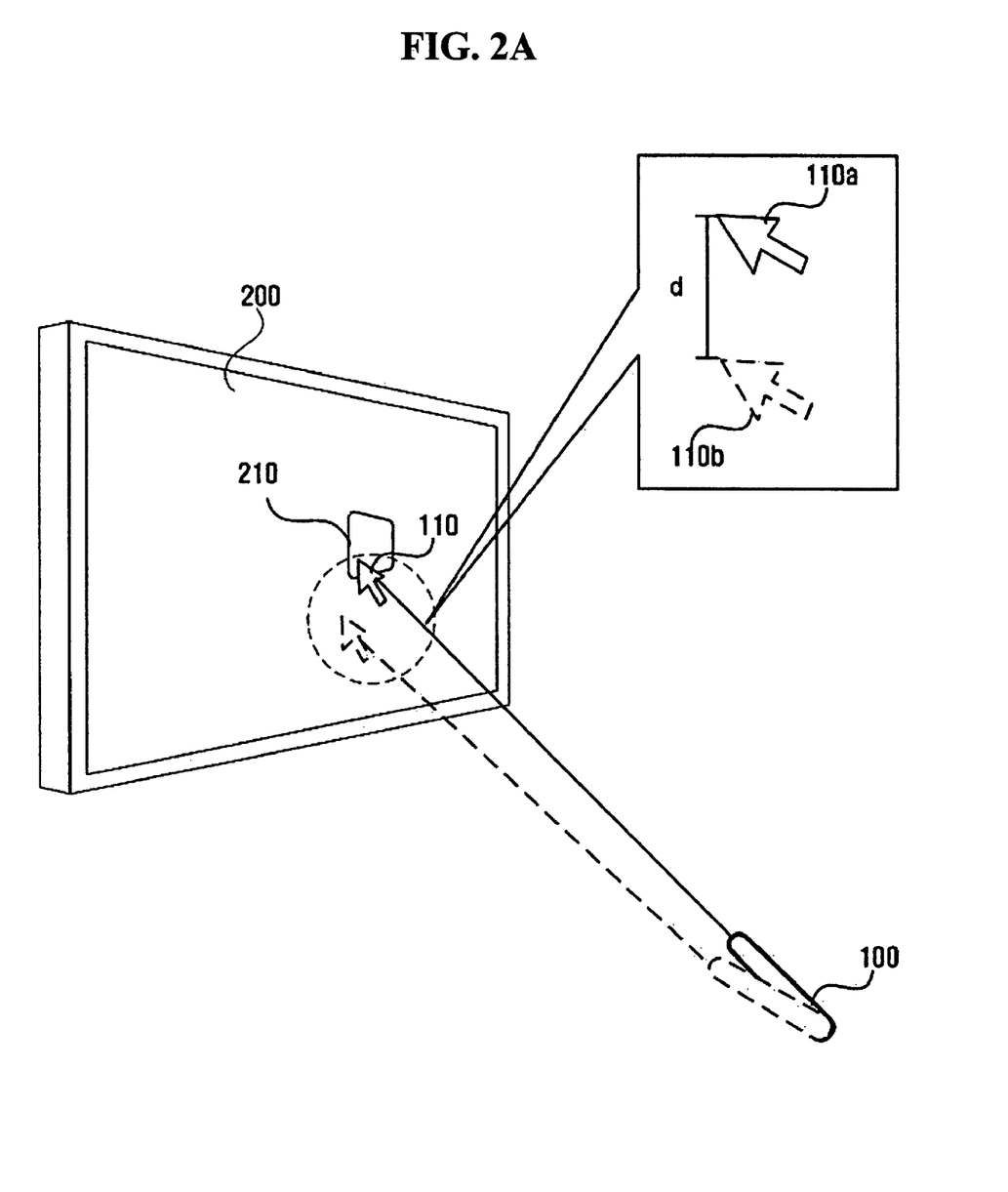
FIGS. 2A and 2B illustrate a change in the location of a pointer of an information input device that inputs information in a 3D space, which may be caused when a user clicks the information input device, according to exemplary embodiments of the present invention.
Figure 2B:
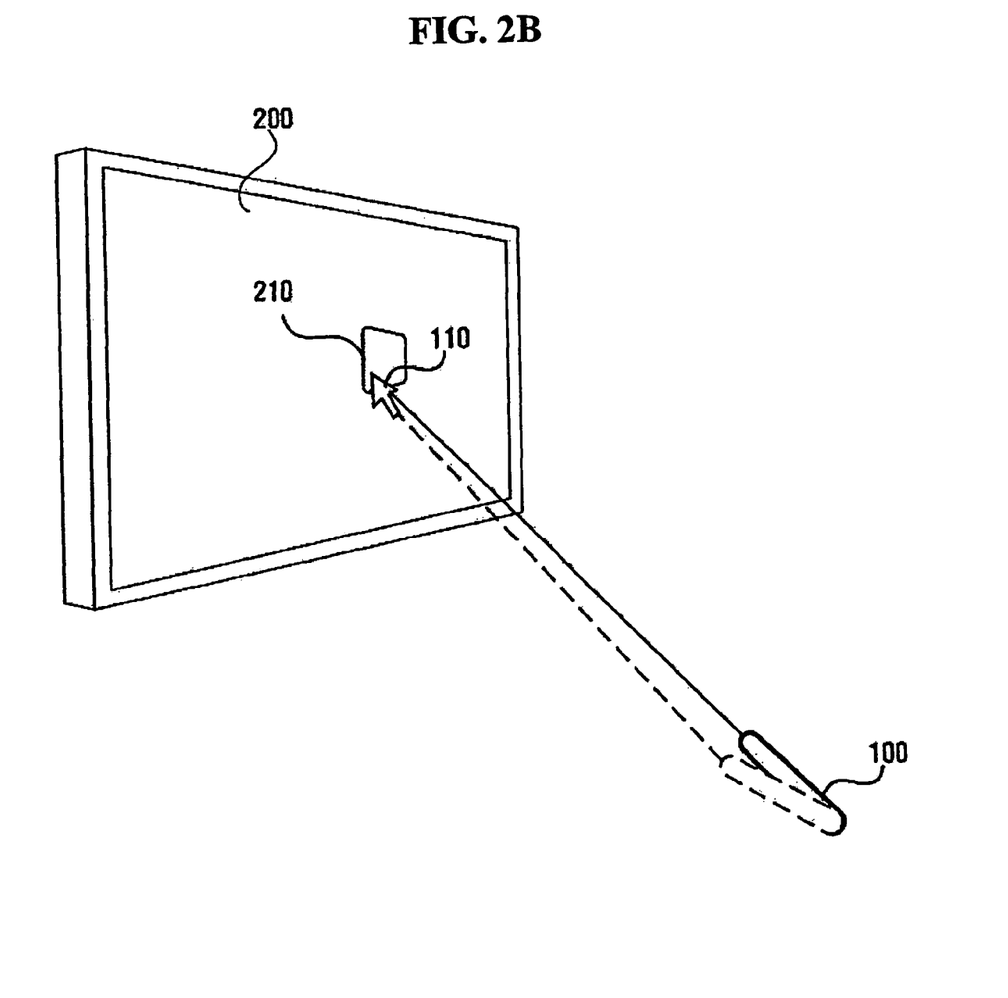

FIGS. 2A and 2B illustrate a change in the location of a pointer of an information input device that inputs information in a 3D space, which may be caused when a user clicks the information input device, according to exemplary embodiments of the present invention.

As illustrated in FIG. 2A, in order to select a predetermined object 210 displayed on a display device 200 using the information input device (mouse) 100, the user locates a pointer 110 on the object 210 by moving the mouse 100.

Next, when the user clicks a button of the mouse 100 so as to select the object 210, the force of the user causes the mouse 100 to move downward through a predetermined angle, and therefore, the pointer 110 is also moved downward from the object 210.

In this case, there is a predetermined distance d, for example, between a pointer 110a located on the object 210 and a pointer 110b moved downward from the object 210 due to the movement of the mouse 100. As a result, the user may be unable to select the object 210 or may select another object.

As illustrated in FIG. 2B, when the movement identification unit 130 determines that the user is clicking a button of the mouse 100, the signal processor 140 does not output the signal value of the gyroscope sensor for a predetermined amount of time, thereby preventing the location of the pointer 110 from being changed. Therefore, it is possible to prevent the user from being unable to select the object 210 or from selecting another object.

Figure 3A:
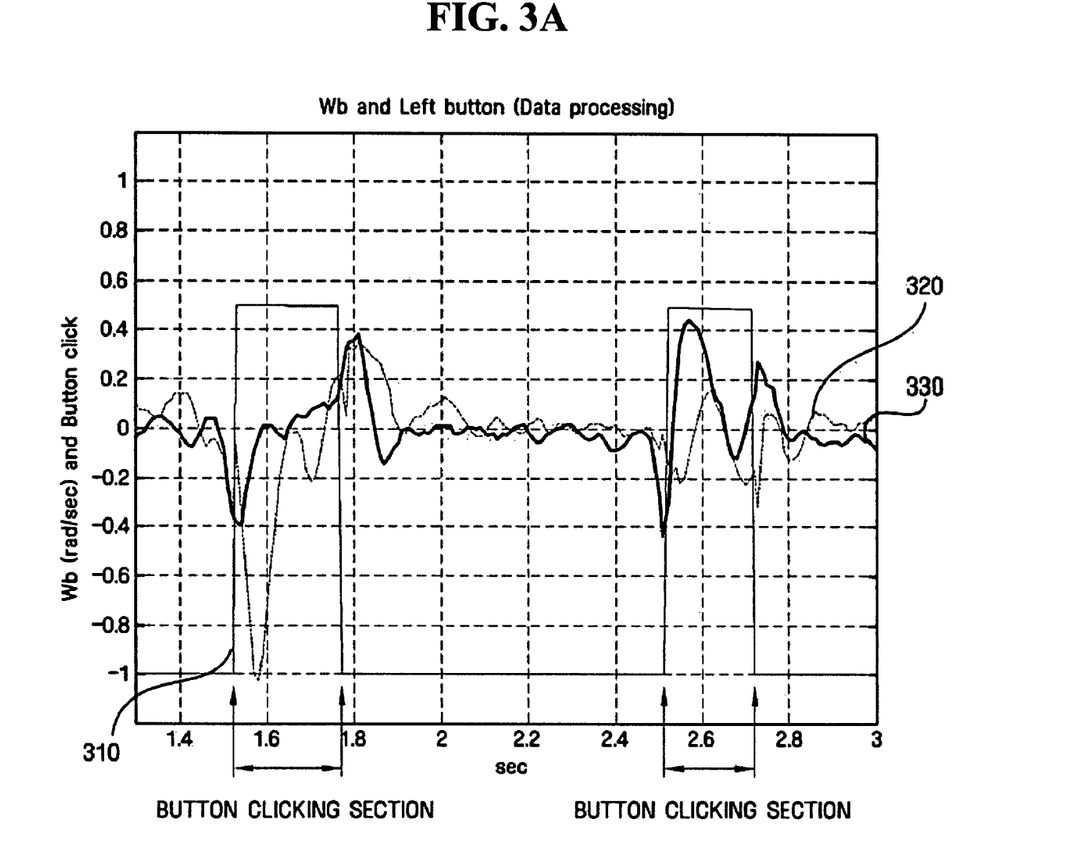
FIGS. 3A and 3B are graphs illustrating a movement signal generated when a button of an information input device that inputs information in a 3D space is clicked, and a method of controlling the movement signal, according to exemplary embodiments of the present invention.
Figure 3B:
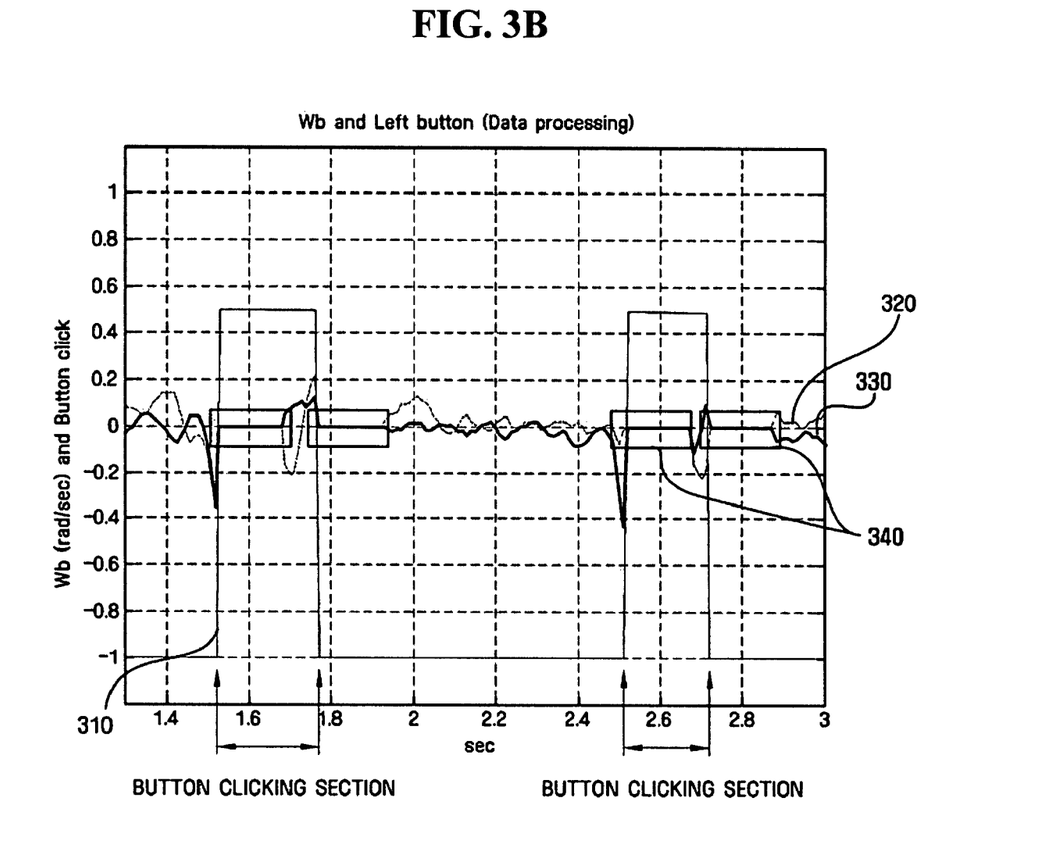

FIGS. 3A and 3B are graphs illustrating a movement signal generated when a button of an information input device that inputs information in a 3D space is clicked, and a method of controlling the movement signal, according to exemplary embodiments of the present invention. In FIGS. 3A and 3B, a solid line 310 indicates a section in which a user is performing a button click operation, a dotted line 320 indicates a signal (an x-axis signal) representing the movement of the information input device 100 from top to bottom, and a bold solid line 330 indicates a signal (a y-axis signal) representing the movement of the information input device 100 from side to side.

As illustrated in FIG. 3A, a movement signal having a small magnitude (a gyro signal) is generated (that is, the movement signal is generated around the origin (0,0) of the graph before clicking a button of the information input device 100 in a 3D space. If the user clicks the button of the information input device 100, the information input device 100 moves from top to bottom and from side to side, thus generating a movement signal having a large magnitude. Here, the greater the movement of the information input device 100, the greater the magnitude of the movement signal.

As described above, when a gyro signal is received from the gyroscope sensor, the signal processor 140 moves the pointer of the information input device 100 based on the magnitude of the gyro signal, and thus, the location of the pointer is changed, thereby causing the user to select an undesired object.

Accordingly, as illustrated in FIG. 3B, the movement signal is not allowed to be output for a predetermined length of time when the user clicks the button of the information input device 100 and when the user cancels the clicking of the button, thereby preventing a focus from being moved by the movement of the information input device 100.

That is, if the user clicks the button of the information input device 100, the information input device 100 moves from top to bottom and from side to side, thus generating a large-magnitude movement signal. In this case, the signal processor 140 does not output the value of the movement signal generated when the button is clicked or when clicking of the button is canceled for a predetermined length of time, as indicated with rectangles 340. Accordingly, the movement signal has a value of 0, thus preventing the focus of the information input device 100 from being moved.

Figure 4A:
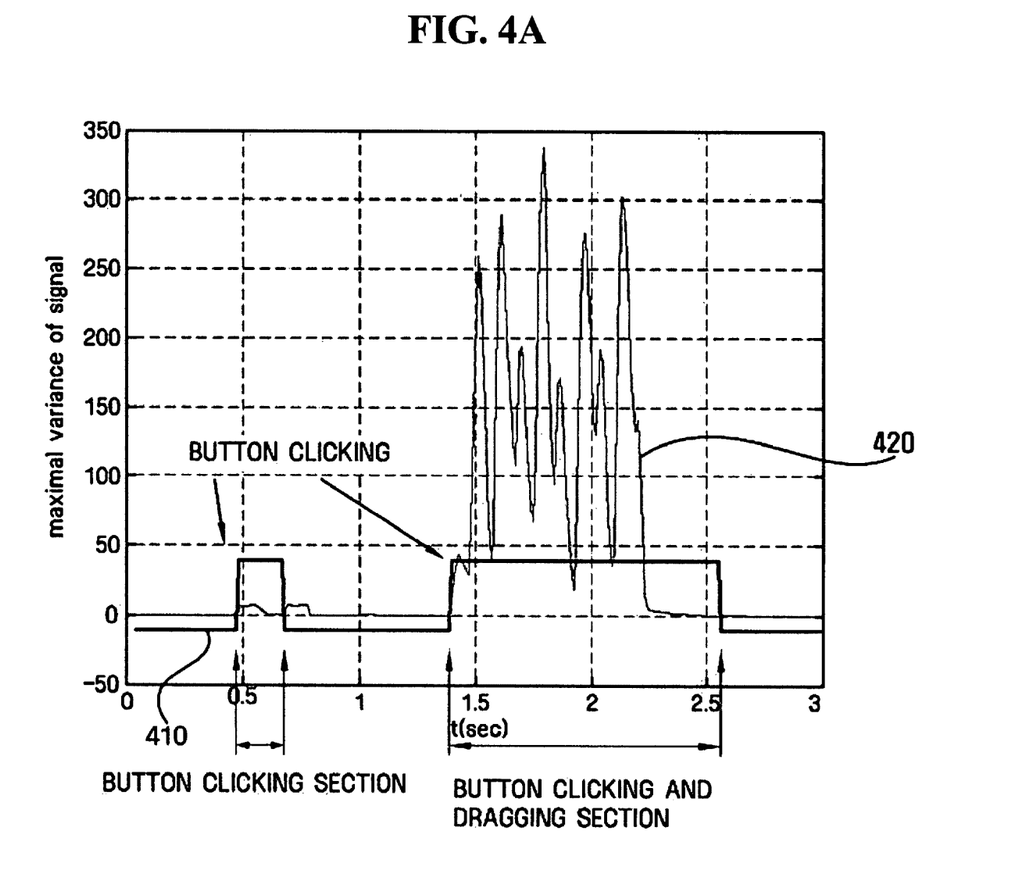
FIG. 4A is a graph illustrating movement signals generated during a button click operation and a drag operation of an information input device that inputs information in a 3D space, according to an exemplary embodiment of the present invention.
Figure 4B:
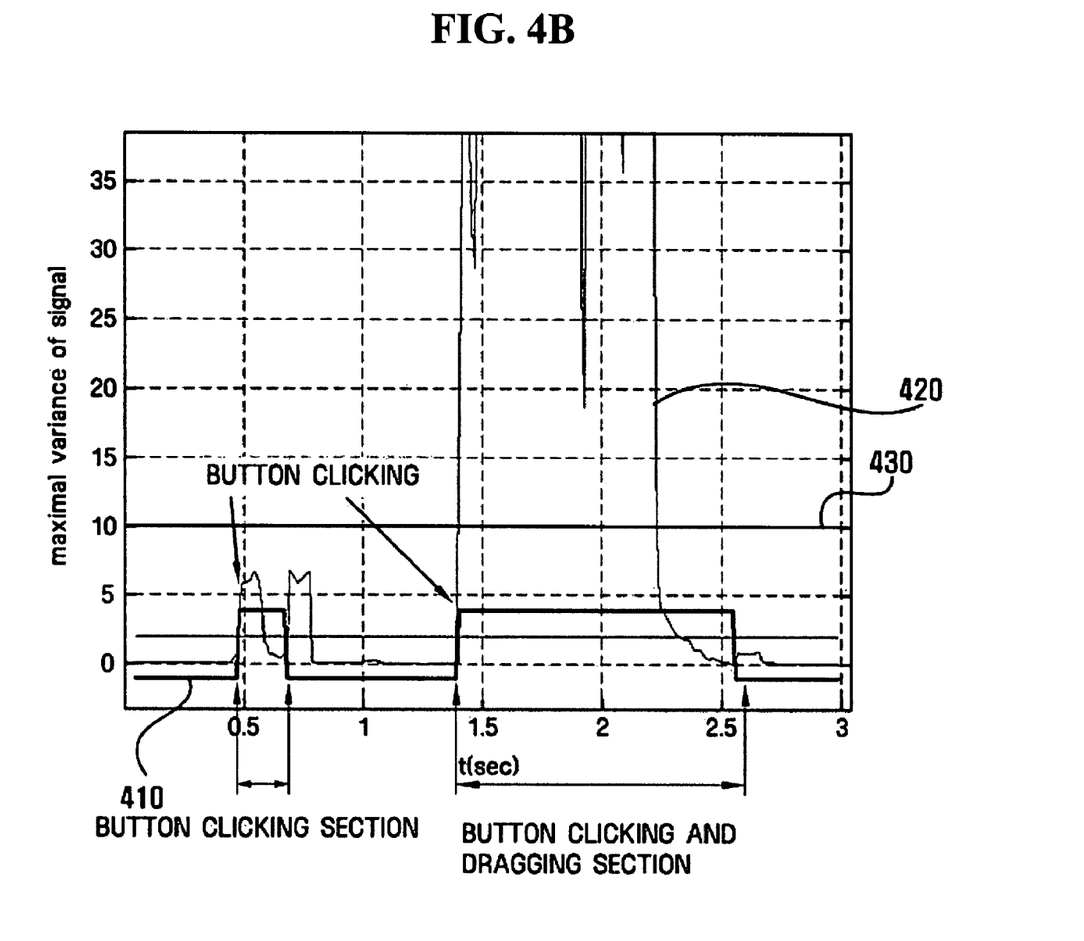
FIG. 4B is an enlarged view of the graph of FIG. 4A for explaining a method of identifying a type of information input device using a predetermined threshold.

FIG. 4A is a graph illustrating movement signals generated during a button click operation and a drag operation of an information input device that inputs information in a 3D space, according to an exemplary embodiment of the present invention; and FIG. 4B is an enlarged view of the graph of FIG. 4A for explaining a method of identifying a type of an information input device using a predetermined threshold. In FIGS. 4A and 4B, a bold solid line 410 indicates a section in which a user clicks a button of the information input device 100, and a solid line 420 indicates a movement signal representing the movement of the information input device 100.

As illustrated in FIG. 4A, when the user performs the button click operation of the information input device 100, a movement signal having a small magnitude (a gyro signal) is generated (that is, the movement signal is generated around the origin (0,0) of the graph). When the user performs a drag operation after the button click operation, a movement signal having a large magnitude is generated. Here, the greater the movement of the information input device 100, the greater the magnitude of the movement signal.

As illustrated in FIG. 4B, when it is assumed that a predetermined threshold 430 is 10, the extent of the movement of the information input device 100 is greater than 5 during the button click operation and is greater than 35 during the drag operation after the button click operation.

In this case, the movement identification unit 130 identifies the type of the movement of the information input device 100 to be the button click operation when the extent of the movement is smaller than the predetermined threshold, and the type of the movement to be the drag operation when the extent of the movement is greater than the predetermined threshold.

Figure 5:
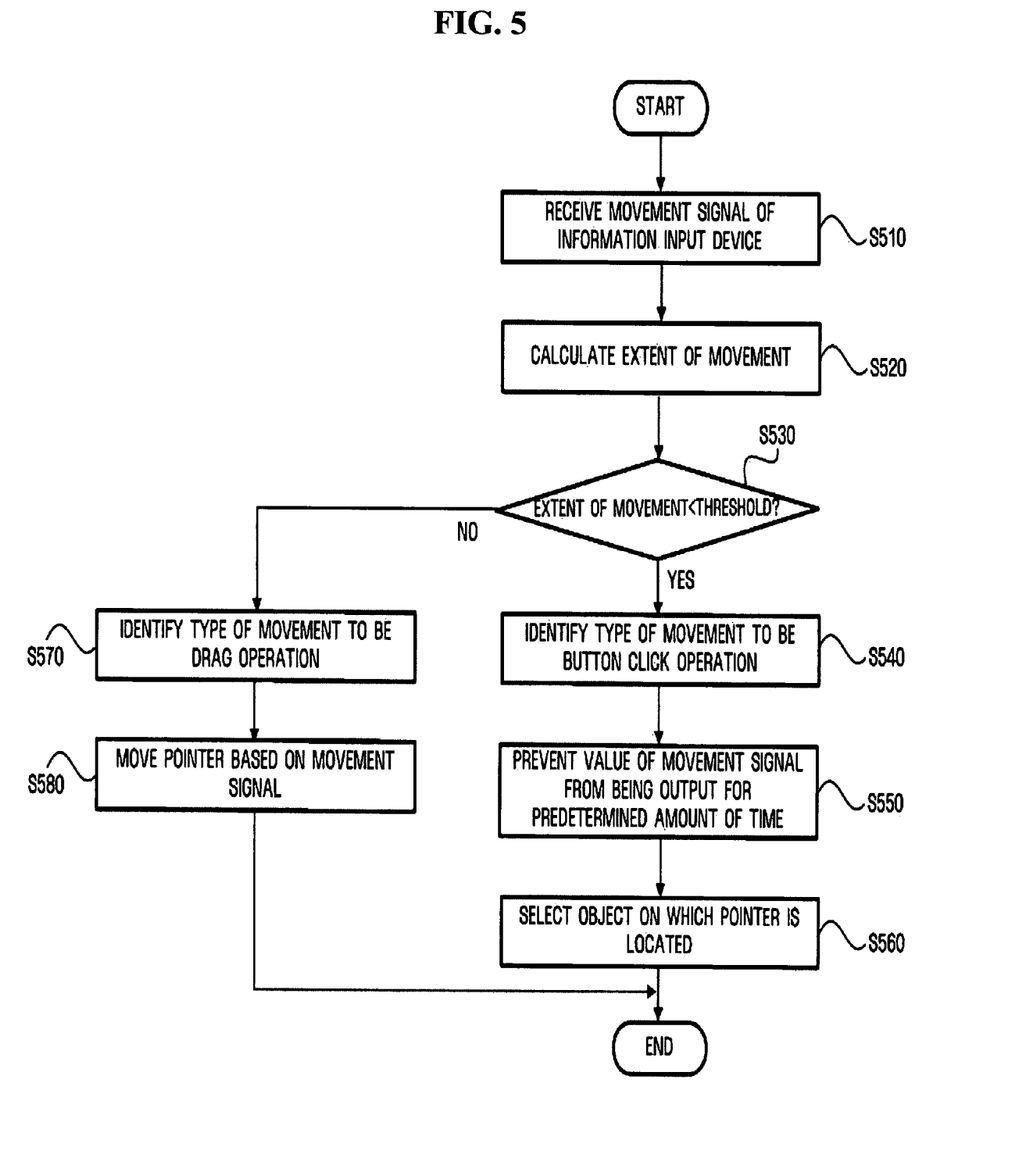
FIG. 5 is a flowchart illustrating a method of inputting information in a 3D space, according to an exemplary embodiment of the present invention.

FIG. 5 is a flowchart illustrating a method of inputting information in a 3D space, according to an exemplary embodiment of the present invention.

Referring to FIG. 5, first, when a movement signal (a gyro signal) of the information input device 100 is received via the movement signal input unit 110 (S510), the movement extent calculating unit 120 calculates the extent of the movement of the information input device 100 based on the received gyro signal (S520). Here, the extent of the movement is calculated based on the x-axis (movement from top to bottom) and the y-axis (movement from side to side) of the gyro signal.

Next, the movement identification unit 130 identifies the type of movement of the information input device 200 by comparing the calculated extent of the movement with a predetermined threshold. Here, the type of the movement includes the button click operation and the drag operation of the information input device 100.

If the comparison result reveals that the calculated extent of the movement is greater than the predetermined threshold (S530), the movement identification unit 130 identifies the type of movement of the information input device 100 to be the button click operation (S540).

Next, since the type of the movement of the information input device 100 is the button click operation, the signal processor 140 does not output the movement signal for a predetermined amount of time starting from an instant of time when the user performs the button click operation (S550). Here, the reason why the movement signal is not output is to prevent the location of the pointer of the information input device 100 from being changed when a predetermined object is to be selected through the button click operation of the information input device 100.

Next, since the movement signal is not output, the pointer controller 150 selects the object on which the pointer is currently located without changing the location of the pointer (S560).

If it is determined in step S530 that the extent of the movement is greater than the threshold, the movement identification unit 130 identifies that the type of movement of the information input device 100 is the drag operation (S570).

Next, the pointer controller 150 moves the location of the pointer so that the location of the pointer corresponds to the value of the movement signal (S580).

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module" and the term "unit", as used herein, denote, but are not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processor.

The computer readable code/instructions and computer readable medium/media may be those specially designed and constructed for the purposes of the present invention, or they may be of the kind well-known and available to those skilled in the art of computer hardware and/or computer software.

The above information input device and method and medium for inputting information in a 3D space, according to exemplary embodiments of the present invention, have at least one advantage as follows. The above information input device and method and medium are capable of solving a problem whereby a cursor position before clicking a button of the information input device in a 3D space is changed after clicking the button, thereby improving the performance of pointing.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An information input device for inputting information in three-dimensional space, comprising:
   an input unit to receive a user input;
   motion detector to detect a movement of the information input device in a three-dimensional (3D) space;
   a movement identifier to identity a movement type of the information input device based on output information from the motion detector;
   a pointer controller to move or to maintain a location of a pointer on a screen of a display device; and
   a processor configured to
   determine whether the movement type is a user actuation for the input unit or a drag operation of the information input device in the 3D space based on information outputted from the movement identifier, and configured to change or maintain the location of the pointer on the screen based on the output information and the movement type,
   wherein if the movement type is the user actuation for the input unit, the location of the pointer on the screen is not changed,
   wherein if the movement type is the drag operation, the pointer is dragged on the screen, and
   wherein the pointer is located on an object based on the output information, and the movement type is determined to be a button click operation of the input unit if a movement of the pointer is smaller than a predetermined threshold.

2. A method for inputting information in three-dimensional space, comprising:
receiving a movement signal of an information input device in a three-dimensional (3D) space under control of a user;
identifying a movement type of the information input device based on the received movement signal;
moving or maintaining a location of a pointer on a screen of a display device; and processing the movement signal, to determine whether the movement type is a user actuation for the information input device or a drag operation of the information input device in the 3D space based on the identification of the movement type, and to change or maintain the location of the pointer on the screen based on the movement type,
wherein if the movement type is the user actuation for the information input device, the location of the pointer on the screen is not changed,
wherein if the movement type is the drag operation, the pointer is dragged on the screen, and
wherein the pointer is located on an object based on the output information, and the movement type is determined to be a button click operation of the information input device if a movement of the pointer is smaller than a predetermined threshold.

3. At least one non-transitory computer readable medium storing computer readable instructions that control at least one processor to implement the method of claim 2.

4. The method of claim 2, wherein, when a value of the movement signal is not output for a predetermined amount of time, the location of a pointer of the information input device is not changed and object on which the pointer is currently located is selected.

5. The information input device of claim 1,
wherein, if the value of the movement signal is not output for a predetermined amount of time, the location of a pointer of the information input device is not changed and the pointer controller selects object on which the pointer is currently located.

* * * * *